United States Patent [19]
Critchfield et al.

[11] 4,000,218

[45] Dec. 28, 1976

[54] PROCESS FOR PREPARING PARTICULATE POLYURETHANE POLYMERS AND THE POLYMERS DERIVED THEREFROM

[75] Inventors: Frank Edward Critchfield, South Charleston; Frank Paul Del Giudice; Richard Michael Gerkin, both of Charleston, all of W. Va.

[73] Assignee: Union Carbide Corporation, New York, N.Y.

[22] Filed: July 17, 1975

[21] Appl. No.: 596,631

Related U.S. Application Data

[63] Continuation of Ser. No. 421,331, Dec. 3, 1973.

[52] U.S. Cl. .................. 260/858; 260/33.6 UB; 260/77.5 AM; 260/859 R; 260/859 PV
[51] Int. Cl.$^2$ .......................... C08L 75/12
[58] Field of Search ............ 260/858, 33.6 UB, 859

[56] References Cited

UNITED STATES PATENTS

| | | | |
|---|---|---|---|
| 2,962,524 | 11/1960 | Hostettler et al. | 260/75 R |
| 3,236,812 | 2/1966 | McElroy | 260/75 |
| 3,317,635 | 5/1967 | Osmond et al. | 260/881 |
| 3,383,351 | 5/1968 | Stamberger | 260/47 UA |
| 3,420,791 | 1/1969 | Gurgiolo et al. | 260/33.6 |
| 3,420,796 | 1/1969 | Matsubayashi et al. | 260/47 |
| 3,519,577 | 7/1970 | Olson | 260/2.5 |
| 3,607,821 | 9/1971 | Clarke et al. | 260/34.2 |
| 3,632,669 | 1/1972 | Lundberg et al. | 260/874 |
| 3,721,640 | 3/1973 | Wilheim et al. | 260/881 |
| 3,787,525 | 1/1974 | McGarr | 260/859 R |
| 3,817,886 | 6/1974 | McGarr | 260/18TN |
| 3,917,741 | 11/1975 | McGarr | 260/859 R |

*Primary Examiner*—Murray Tillman
*Assistant Examiner*—A. H. Koeckert
*Attorney, Agent, or Firm*—Reynold J. Finnegan

[57] ABSTRACT

Particulate thermoplastic polyurethane polymers are produced in inert organic non-solvent for the polymer by polymerization of diisocyanate, dihydroxy polymer and chain extender in the presence of an organic polymeric interfacial agent. The agent can be a block copolymer of $C_6$–$C_{30}$ alkyl alkenoate and vinyl halide, a block copolymer of the alkenoate and a polyoxyalkylene glycol, a block copolymer of the alkenoate and a cyclic ester such as caprolactone, or a graft copolymer of the alkenoate, vinyl monomer with hydroxyl or amino group such as an hydroxyalkyl acrylate or an amino alkyl acrylate, and a cyclic ester.

18 Claims, No Drawings

PROCESS FOR PREPARING PARTICULATE POLYURETHANE POLYMERS AND THE POLYMERS DERIVED THEREFROM

This application is a continuation of U.S. Application Ser. No. 421,331 filed Dec. 3, 1973.

BACKGROUND OF THE INVENTION

This invention relates to a novel process for the production of polyurethane polymers and to the novel polyurethane polymer products derived from said process. More particularly this invention is directed to a process for preparing particulate thermoplastic polyurethane polymers and to the particulate polymers derived from said process.

Thermoplastic polyurethane polymers constitute a broad class of polymeric materials that are well known in the art and have a wide range of utility. Such polymers are essentially uncrosslinked and are conventionally produced through the interaction of a diisocyanate, a dihydric compound having two active hydrogen atoms in its structure such as polyethers or polyesters, and a chain extending agent also having two active hydrogen atoms in its structure such as an organic diol or diamine. Normally said polyurethane polymers are produced in slab form or some other form not suitable for use in application techniques employed with powdered type resins such as polyethylene. Such techniques include e.g. flame coating, heated substrate coatings, rotational coating, calendering, powder blending with other polymers, sintered shaped articles and coatings, and the like. Consequently such conventional types of thermoplastic polyurethane products have to undergo a reduction in particle size in order to be utilized in such application techniques. While the polyurethane polymer may be reduced in particle size by various expediences such as grinding, chipping, dicing, etc., such methods result in coarse, non-uniform final products, are time consuming, and have other numerous obvious economic drawbacks. Thus there is a definite need in the art for a process that will produce thermoplastic polyurethane polymers in particulate form.

It has now been discovered that particulate thermoplastic polyurethane polymers can indeed be produced by the process of the instant invention which comprises contacting and reacting an organic dihydric containing compound, an organic diisocyanate, a di-functional organic chain extending agent and an organic interfacial agent in the presence of an inert organic vehicle in which the resulting particulate thermoplastic polyurethane polymer is essentially insoluble.

SUMMARY OF THE INVENTION

Therefore it is an object of this invention to provide novel particulate thermoplastic polyurethane polymers. It is a further object of this invention to provide a novel dispersion process for the production of said particulate polymers. Other objects and advantages of this invention will become readily apparent from the following description and appended claims.

More specifically, the process of the instant invention may be described as a process for producing a particulate thermoplastic polyurethane polymer which comprises contacting and reacting (a) an organic dihydroxy containing polymer; (b) an organic difunctional chain extending agent having two active hydrogen atoms reactive with the isocyanate groups of the diisocyanate compound; (c) an organic diisocyanate compound; and (d) an organic polymeric interfacial agent, said interfacial agent being characterized (1) by a solvatable constituent (i) which is solvatable in inert normally liquid saturated hydrocarbons, (ii) which is essentially incompatible with the soft segment of the particulate thermoplastic polyurethane polymer product, and (iii) which has an average molecular weight of up to about 500,000 and (2) by a non-solvatable constituent (i) which is non-solvatable with such inert normally liquid, saturated hydrocarbons, (ii) which is compatible with the soft segment of the particulate thermoplastic polyurethane polymer product, and (iii) which has an average molecular weight of at least about 1000 and is at least about 0.05 to about 10 times the average molecular weight of the solvatable constituent; (e) in the presence of an inert organic vehicle in which the ingredients (a), (b) and (d) are dispersible and in which the particulate thermoplastic polyurethane polymer product is insoluble; said reaction being conducted under essentially anhydrous conditions and for a period of time sufficient to produce the particulate thermoplastic polyurethane polymer.

DESCRIPTION OF THE PREFERRED EMBODIMENTS

As pointed out, the basic production of thermoplastic polyurethane polymers involving the polymerization reaction of a dihydric compound, a diisocyanate and a difunctional chain extending agent is well known in the art, as witnessed for example by U.S. Pat. Nos.: 2,871,218; 3,214,411; 3,432,474; 3,523,093 and 3,538,700, the disclosures of which are incorporated herein by reference thereto.

The dihydric compounds employed as starting materials in accordance with the process of this invention are well known in the art and are organic dihydroxy containing polymers, such as polyether diols, polyester diols and polymer/polyol diols which form what is commonly referred to as the soft segment of the final polyurethane product. Said organic dihydroxy containing polymers can have average weights ranging from about 300 to about 3,000 and hydroxyl numbers from about 375 to 22.

Of course it is to be understood that mixtures of such organic dihydroxy containing polymers can be employed as reactants with the diisocyanate in accordance with the process of this invention. It is also to be understood that in addition to the above organic dihydroxy containing polymers a small amount e.g. less than 1 percent by weight of higher polyhydric compounds such as trihydric alcohol, e.g. gylcerine, trimethylolpropane, hexanetriol, pentaerythritol, and the like, may also be present so long as they do not unduly adversely effect the essentially uncrosslinked nature of the thermoplastic polyurethane polymer product desired to be obtained.

The hydroxyl number is defined as the number of milligrams of potassium hydroxide needed to react with the acid generated from the reaction of one gram of the hydroxyl containing compound with phthalic anhydride. The hydroxyl number can also be defined by the equation:

$$OH = (56.1 \times 1000 \times f)/M.W.$$

where $OH$ = hydroxyl number of the diol, $f$ = functionality, i.e., average number of hydroxyl groups per molecule of diol, M.W. = average molecular weight of the diol.

One preferred class of such dihydroxy containing materials includes essentially linear hydroxy terminated polyethers such as polyoxyalkylene glycols including polytetramethylene glycols and alkylene oxide adducts of various difunctional starters. Such polyether diols are well known in the art. Illustrative examples of such adducts are the alkylene oxide adducts of ethylene oxide, proplyene oxide, butylene oxides and mixtures thereof, with water or dihydric compounds such as ethylene glycol, diethylene glycol, propylene glycol, dipropylene glycol, butylene glycol, aniline, and the like. Preferred polyether diols are the polytetramethylene glycols and the ethylene or propylene oxide adducts of straight chain aliphatic glycols containing from 2 to 10 carbon atoms. Such hydroxy terminated polyethers preferably have average molecular weights ranging from about 300 to about 4,000 and hydroxyl number of about 375 to about 28. Most preferred are the polytetramethylene glycols having average molecular weights of 1000 to 3000 and hydroxy number of 111 to 37.

The most preferred class of all such dihydroxy containing starting materials are the polyester diols e.g., essentially linear hydroxy terminated polyesters, and more especially such polyesters commonly referred to as polylactone diols.

Illustrative examples of such linear hydroxy terminated polyesters include the esterification products of dicarboxylic acids, such as adipic, succinic, pimelic, suberic, azelaic, sebacic, phthalic, cyclohexanedicarboxylic acid, and the like or their anhydrides with aliphatic glycols. Preferred acids are those dicarboxylic acids of the formula HOOC—R—COOH where R is an alkylene radical containing from 2 to 8 carbon atoms, especially the polymethylene dicarboxylic acids, while the most preferred acid is adipic acid. Preferred aliphatic glycols are the straight chain glycols containing from 2 to 10 carbon atoms, such as ethylene glycol, propylene glycol, 1,4-butanediol, 1,6-hexamethylenediol, 1,8-octamethylenediol, and the like, especially the polymethylene diols containing from 4 to 8 carbon atoms, while the most preferred glycol is 1,4-butanediol. Such hydroxy terminated polyesters preferably have average molecular weights ranging from about 500 to about 3000 and hydroxyl numbers of about 225 to 37.

Illustrative examples of such polylactone diol type esters include those prepared by polymerizing a lactone with or without a bifunctional initiator as well as those prepared by reacting a mixture of a lactone and an alkylene oxide with a bifunctional initiator. Such polylactone diols as well as the methods for their preparation are well known in the art as witnessed e.g., by U.S. Pat. Nos. 3,021,309 through 3,021,317; 3,169,945; and 2,962,524, the disclosures of which are incorporated herein by reference thereto. Suitable lactone monomers which can be employed in the manufacture of the polylactone diols can be illustrated by the formula

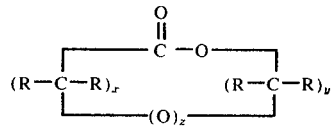

wherein each $R$ individually is a hydrogen, alkyl, halogen or alkoxy radical; $x$ is an integer of 1 to 4; $z$ has a value of 0 or 1; the sum of $x + y + z$ is at least 4 and no greater than 6; and the total number of R groups which are substituents other than hydrogen does not exceed 3 and preferably does not exceed 2. Illustrative R groups include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R individually be hydrogen, lower alkyl, e.g. methyl, ethyl, n-propyl, isobutyl, and/or lower alkoxy, e.g. methoxy, ethoxy, propoxy, n-butoxy, and the like. It is further preferred that the total number of carbon atoms in the R substituents does not exceed 8. Illustrative cyclic ester monomers include, e.g. epsilon-caprolactone, delta-valerolactone, zetaenantholactone, eta-caprylolactone, monomethyl-deltavalerolactone, monomethyl-epsilon-caprolactone, dimethyl-delta-valerolactone, and the like. Suitable bifunctional initiators include diols and diamines containing from 2 to 10 carbon atoms such as ethylene glycol, diethylene glycol, propylene glycol, dipropylene glycol, bis(4-aminophenyl)methane, ethylenediamine and the like, while illustrative alkylene oxides include those mentioned above. Such polylactone diol esters preferably have average molecular weights ranging from about 500 to 3000 and hydroxyl numbers of about 225 to 37. The most preferred polylactone diols are those prepared by reacting a lactone especially epsilon-caprolactone or methyl-epsilon-caprolactone with a lower alkylene glycol or diamine initiator.

Still another useful class of such dihydroxy containing materials are the polymer/polyol compositions obtained by polymerizing ethylenically unsaturated monomers in a polyol as described in Canadian Patent 735,010; British Patent 1,063,222, and U.S. Pat. No. 3,383,351, the disclosures of which are incorporated herein by reference thereto. Suitable monomers for producing such compositions include acrylonitrile, vinyl chloride, styrene, butadiene, vinylidine chloride and other such ethylenically unsaturated monomers. Suitable polyols include those diols listed and described hereinabove and in said patents. The polymer/polyol compositions can contain from about 1 to 70 weight percent, preferably about 5 to about 50 weight percent, and most preferably about 10 to about 40 weight percent monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonates, perborates and azo compounds. Further details of the compositions and methods of making same are described in the above mentioned patents. The resulting polymer/polyol composition is believed to be a complex mixture comprising free polyol, free polymer and graft polymer/polyol complexes. Preferably such polymer/polyols have average molecular weights ranging from about 300 to about 5100 and hydroxyl numbers of about 375 to 22. The preferred polymer/polyols are those of acrylonitrile and polyoxyalkylene glycol.

Both aliphatic and aromatic organic diisocyanates can be used in accordance with the process of this invention to react with the dihydric starting materials to form the instant thermoplastic polyurethane polymer products. Such diisocyanates are well known in the art and form part of what is commonly referred to as the hard segment of the polyurethane product. Illustrative examples of same include tetramethylene-1,4-diisocyanate, hexamethylene-1,6-diisocyanate, p-phenylene diisocyanate, m-phenylene diisocyanate, 1-chlorophenylene-2,4-diisocyanate, naphthalene-1,5-diisocyanate, tolylene-2,4-diisocyanate, tolylene-2,6-diisocyanate, dichlorodiphenyl methane diisocyanate, 4,4'-diphenylmethane diisocyanate, 2,4'-diphenylmethane diisocyanate, dimer of diphenylmethane diisocyanate, 4,4'-diphenyl diisocyanate, cyclohexylene-1,4-diisocyanate, and the like. Of course it is obvious that mixtures of two or more of such diisocyanates can be employed if desired and such is often common in view of the fact that isomeric mixtures of said diisocyanates are normally formed during their commercial production. Diphenylmethane diisocyanates, especially 4,4'-diphenylmethane diisocyanate, and mixtures thereof are preferred.

Any suitable organic difunctional chain extending agent having two active hydrogen containing groups reactive with isocyanate groups can be used in accordance with the process of this invention. Such agents are conventional and are well known in the art as witnessed e.g. by U.S. Pat. Nos. 2,620,516; 2,621,166; 2,729,618 and 3,214,411. Illustrative examples of such difunctional chain extenders include dihydroxy compounds such as ethylene glycol, propylene glycol, butylene glycol, 1,4-butanediol, butenediol, butynediol, xylylene glycols, amylene glycols, 1,4-phenylene-bis-$\beta$-hydroxy ethyl ether, 1,3-phenylene-bis-$\beta$-hydroxy ethyl ether, bis-(hydroxy methyl-cyclohexane), 1,6-hexanediol, thiodiglycol and the like; diamines including ethylene diamine, propylene diamine, cyclohexylene diamine, phenylene diamine, tolylene diamine, xylylene diamine, 3,3'-dichlorobenzidine, 3,3'-dinitrobenzidine, and the like, and alkanolamines such as ethanolamine, aminopropyl alcohol, 2,2-dimethyl propanolamine, 3-aminocyclohexyl alcohol, p-aminobenzyl alcohol, and the like. Preferably the chain extender is a straight chain saturated aliphatic glycol containing from 2 to 10 carbon atoms, especially 1,4-butanediol.

The interfacial agents employed in the practice of the novel process of this invention are organic polymers which have a reduced viscosity value of from about 0.01 to about 5.0 and higher, said interfacial agent being characterized (1) by a solvatable constituent (i) which is solvatable in inert, normally-liquid, saturated hydrocarbons, (ii) which is essentially incompatible with the soft segment of the particulate polymeric polyurethane product, and (iii) which has an average molecular weight of up to 500,000 and (2) by a non-solvatable constituent (i) which is non-solvatable with such inert, normally-liquid, saturated, hydrocarbons (ii) which is compatible with the soft segment of said particulate polyurethane polymers, and (iii) which has an average molecular weight of at least about 1000 and is at least about 0.05 to about 10 times the average molecular weight of the solvatable constituent.

The interfacial agents, as indicated above, are organic polymers and most desirably include block and graft copolymers which are believed to become associated integrally with the particulate polymeric polyurethane product primarily through the non-solvatable constituent of the interfacial agent. The "block or graft" copolymers, as used herein, have the structure normally implied by such term, that is, they comprise copolymers in which the constituents are present not as random monomer units but as a chain of one polymer to which is attached one or more chains of another polymer. The chains of polymer may comprise one monomer or a random arrangement of two or more monomers.

The interfacial agents may be preformed and then added to the reaction medium, and any catalyst normally employed in the formation of the polyurethane polymers may be used in the novel process.

As indicated above, the novel process is effected in the presence of an inert organic vehicle in which the dihydroxy-containing compound, chain extending agent and interfacial agent are dispersible and in which the resulting particulate polyurethane polymer is insoluble. Any relatively non-polar, inert, organic vehicle which is a liquid under the polymerization reaction conditions may be employed in the novel process. Illustrative inert organic vehicles which are contemplated are the normally-liquid hydrocarbons including the acyclic and alicyclic saturated hydrocarbons such as pentane, hexane, heptane, octane, dodecane, cyclopentane, cyclohexane, cycloheptane, the alkyl-substituted cycloalkanes, decahydronaphthalene, various normally-liquid petroleum hydrocarbon fractions, various high boiling mineral oils, and the like. Mixtures of inert organic vehicles can be employed, and mixtures of the aforesaid illustrated organic vehicles with a small amount of an aromatic liquid may be tolerated. Preferably the vehicle is a saturated aliphatic hydrocarbon, especially decane.

Once having determined the nature and choice of the particulate thermoplastic polyurethane polymer and inert organic vehicle in the light of the foregoing teachings, one can select the interfacial agent having the suitable constituents.

The solvatable constituent of the interfacial agent may range in size from that of a conventional surfactant up to an average molecular weight of about one million. While the specific amount is not narrowly critical it should be at least sufficient to insure solubility of that segment of the interfacial agent in the polymerization medium, i.e., the inert organic vehicle employed. Thus it is readily appreciated that at low average molecular weights relatively large proportions of solvatable constituents may be required and even that the dispersion of the interfacial agent may be somewhat coarse. Consequently, it is generally desirable that the solvatable constituents have an average molecular weight of at least about 1000, preferably from about 5000 to 100,000.

Thus the nature of the solvatable constituent of the interfacial agent is governed by the nature of the inert organic vehicle. In contrast to the dispersed dihydroxy containing compound, the solvatable constituent should be of a similar degree of polarity as the inert organic vehicle. This is relatively easy to determine since if, for example, a normally-liquid saturated aliphatic hydrocarbon is chosen as the organic vehicle, then the solvatable constituent can comprise a saturated aliphatic hydrocarbon chain.

The non-solvatable constituent of the interfacial agent most generally has an average molecular weight of at least about 1000 and is at least about 0.05 to about 10 times the total molecular weight of the solvatable constituents. Desirably the non-solvatable constituent has an average molecular weight of at least about 2500 and is at least about 0.1 to about 5.0 times the total molecular weight of the solvatable constituents. As indicated previously, the non-solvatable constituents (as well as the particulate polyurethane polymer) must be essentially insoluble in the inert organic vehicle and compatible with the soft segment of the particulate polyurethane polymer product. Most polymers, however, have only limited compatibility with other polymers, and consequently it is generally preferred that the non-solvatable constituent be of the same material as the soft segment of the particulate polyurethane polymer or closely related thereto. For example, while highly compatible polycaprolactone has been found to be the preferred non-solvatable constituent of the interfacial agents, especially for dihydroxy cyclic ester starting materials, said caprolactone is not compatible with polytetramethylene glycol starting materials and such incompatibility negates the production of the desired particulate polymer product. Thus, if polytetramethylene glycol were employed as the starting material it would preferably require an interfacial agent based on polytetramethylene glycol.

A simple test of compatibility involves mixing the polymers of interest (about 50/50 weight percent blend/and heating the blend to the temperature of the reaction. The compatibility (solubility) of the blend is then observed after thorough mixing. Compatible systems will become clear and form one phase under these conditions, while incompatible systems remain cloudy and form two distinct phases.

Preformed block or graft copolymeric interfacial agents can be prepared by conventional methods which are well-documented in the literature.

In general, the interfacial agents contemplated in the present invention have reduced viscosity values of at least about 0.01, most desirably from about 0.05 to about 5, and preferably from 0.1 to about 3.0. As is well known in the art, reduced viscosity value is a measure or indication of the molecular weight of polymers. Consequently, the molecular weights of the interfacial agents and the polyurethane polymer products can be indicated by their reduced viscosity values. The expression "reduced viscosity" is a value obtained by dividing the specific viscosity by the concentration of polymer (interfacial agent or polyurethane polymer) in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, dimethylformamide, or other common organic solvents) at 30° C.

Illustrative classes of the interfacial agents that can be employed in the practice of this invention include the block copolymers of $C_6$–$C_{30}$ alkyl$\alpha,\beta$-alkenoate and vinyl halide, the block copolymers of $C_6$–$C_{30}$ alkyl$\alpha,\beta$-alkenoate and a polyoxyalkylene glycol, the block copolymers of $C_6$–$C_{30}$ alkyl$\alpha,\beta$-alkenoate and a cyclic ester and the graft copolymers of $C_6$–$C_{30}$ alkyl$\alpha,\beta$-alkenoate, a vinyl monomer and a cyclic ester.

Illustrative examples of such monomeric alkenoates that may be used to make up the solvatable constituent of the interfacial agents of this invention are n-hexyl acrylate, octyl acrylate, isodecyl acrylate, dodecyl crotonate, isodecyl methacrylate, vinyl stearate, myristyl methacrylate, stearyl methacrylate, stearyl 2-hexenoate, lauryl methacrylate, pentacosyl methacrylate, and the like, including mixture of such acrylates and copolymers of such acrylates, e.g. the copolymer of n-hexyl acrylate and isodecyl acrylate. As pointed out above, it is preferred that the alkyl chains of any specific alkenoate employed be long enough to insure solubility of that segment of the interfacial agent in the polymerization medium at the desired reaction temperature. The preferred alkenoates are lauryl methacrylate, isodecyl acrylate and the copolymer of n-hexyl acrylate and isodecyl acrylate.

Illustrative examples of such vinyl halides that may be used to make up the non-solvatable constituent of the blocked alkenoate/vinyl halide copolymer interfacial agents include vinyl chloride, vinyl bromide, vinyl iodide, vinyl fluoride, allyl chloride, and the like, especially preferred is vinyl chloride.

Illustrative examples of such polyoxyalkylene glycols that may be used to make up the non-solvatable constituent of the block alkenoate/polyoxyalkylene glycol copolymer interfacial agents include those glycol compounds including polytetramethylene glycol mentioned above.

The graft alkenoate, vinyl monomer, cyclic ester copolymer interfacial agents can be those prepared by either of two conventional methods. For example, such graft copolymers can be prepared by copolymerizing in solution the alkenoate monomer with the vinyl monomer followed by further polymerization with the cyclic ester as disclosed in Belgium Patent 778,473 or those prepared by reacting the vinyl monomer with the cyclic ester and then copolymerizing in solution the vinyl monomer terminated cyclic ester polymer with the alkenoate monomer.

Illustrative examples of such vinyl monomers that may be used to help make up the graft copolymer interfacial agents are those of the general formula

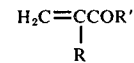

wherein R can be hydrogen or an alkyl radical having from 1 to 3 carbon atoms and R' can be —$OC_nH_{2n}OH$, —$OC_nH_{2n}NH_2$, —$NHC_nH_{2n}OH$, —$NHC_nH_{2n}NH_2$, —$OC_nH_{2n}NHR''$ or —$NHC_nH_{2n}NHR''$ where $n$ has a value of 1 to 5 or higher and R'' is an alkyl radical of 1 to 10 carbon atoms. Preferably such vinyl monomers comprise from about 0.3 mole percent to about 10 mole percent of the graft copolymer. Suitable vinyl monomers that may be mentioned are 2-hydroxyethyl acrylate, 2-hydroxyethyl methacrylate, 2-hydroxypropyl acrylate, 3-hydroxypropyl acrylate, 5-hydroxypentyl acrylate, 2-hydroxyethyl ethacrylate, aminomethyl acrylate, 2-aminoethyl acrylate, 2-aminoethyl methacrylate, 2-(N-methylamino)ethyl acrylate, 2-(N-methylamino)propyl -(N-methylamino)propyl acrylate, 2-(N-butylamino)ethyl methacrylate, 5-(N-methylamino)pentyl acrylate, 2-(N-decylamino)ethyl acrylate, N-(2-hydroxypropyl)acrylamide, N-(aminomethyl)acrylamide, 2-(N-methylamino)ethyl acrylate, 2-(N-ethylaminopropyl) acrylamide, and the like. The preferred vinyl monomers are the hydroxyalkyl acrylates and hydroxyalkyl methacrylates.

Illustrative examples of the cyclic ester monomers that can be employed as the non-solvatable constituent of the interfacial agents of this invention are lactones and oxa-lactones which may be represented by the formula

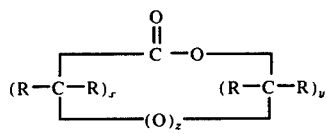

wherein each R taken individually can be hydrogen or an alkyl radical and wherein not more than three of said R groups can be alkyl, z can be 0 or 1, x and y are integers having a value of 1 to 4, when z is 0 the sum of $x + y$ is 4 to 7 and when z is 1 the sum of $x + y + z$ is from 4 to 7. Suitable cyclic esters that may be mentioned are deta-valerolactone, epsilon-caprolactone, zeta-enantholactone, eta-caprylolactone, monomethyl-deta-valerolactone, monomethyl-epsilon-caprolactone, dimethyl-deta-valerolactone, triethyl-deta-valerolactone, 1,4-dioxane-2-one, dimethyl-1,4-dioxane-2-one, and the like. The preferred cyclic ester monomers are the caprolactones, especially epsilon-caprolactone.

The most preferred of all the interfacial agents that can be employed in the practice of this invention are the graft copolymers of $C_6-C_{30}\alpha,\beta$-alkenoate and vinyl monomer terminated cyclic ester. These graft copolymers can be conveniently prepared by conventional process procedures well known in the art such as by reacting the cyclic ester with the vinyl monomer to form a vinyl monomer terminated cyclic ester which is then copolymerized in solution with the alkenoate to produce the desired graft copolymer. For example, the process may be illustrated by the following formula equations:

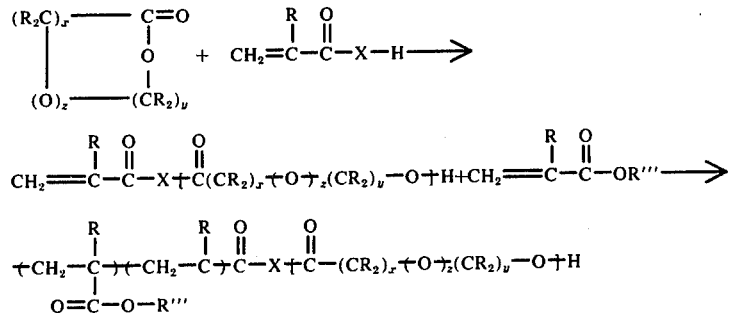

where R, x, y and z are the same as defined above, and X is $-OC_nH_{2n}O-$, $-OC_nH_{2n}NH-$, $-NHC_nH_{2n}O-$, $-NHC_nH_{2n}NH-$, $-OC_nH_{2n}NR''-$ or $-NHC_nH_{2n}NR'''-$ where n and R'' are the same as defined above and R''' is an alkyl radical of from 6 to 30 carbon atoms. The polymerization reactions are preferably carried out in the presence of catalysts or initiators which are well known in the art, such as tin catalysts, peroxide catalysts, and the like. Stannous octoate is the preferred catalyst for the cyclic ester-vinyl monomer reaction, while dibenzoyl peroxide is preferred for the polymerization reaction with the alkenoate monomer. The polymerization reactions may be conducted at temperature from about 40° C to 250° C or higher, preferably about 150° C and at subatmospheric, atmospheric or super atmospheric pressures. Such polymerizations can be carried out in the absence or presence of an inert solvent although it is generally preferred to employ an inert solvent such as an aromatic hydrocarbon e.g. benzene, toluene, and the like, for the graft polymerization reaction. The reaction times will vary depending upon the particular reactants, catalyst, pressure, temperature, size of batch and such other obvious variables. These conditions are known to those familiar with such polymerization technology and such conditions can easily be selected or determined in order to produce the desired graft copolymer. Of course it is also to be understood that individual monomer reactants as well as mixtures of such reactants can be employed.

Examples of such specific block alkenoate/vinyl halide copolymers that may be mentioned are the block copolymers of lauryl methacrylate and vinyl chloride; of vinyl stearate and vinyl chloride; of myristyl methacrylate and vinyl chloride; of stearyl methacrylate and vinyl chloride; of steryl 2-hexenoate and vinyl fluoride; of octyl acrylate and vinyl chloride; of pentacosyl methacrylate and vinyl chloride; of isodecyl acrylate and vinyl chloride; of a copolymer of n-hexyl acrylate (77.5%) – isodecyl acrylate (22.5%) and vinyl chloride; and the like. Preferably such copolymers are the block copolymers of $C_6-C_{30}$ alkyl$\alpha,\beta$-alkenoate and vinyl chloride, especially the block copolymer of lauryl methacrylate and vinyl chloride.

Examples of such specific block alkenoate/polyoxyalkylene glycol copolymers that may be mentioned are the block copolymers of lauryl methacrylate and polytetramethylene glycol, of isodecyl acrylate and polytetramethylene glycol, of isodecyl methacrylate and polytetramethylene glycol; of isodecyl methacrylate and polytetramethylene glycol; of isodecyl acrylate and polyoxypropylene glycol, and the like. Preferably such copolymers are the block copolymers of $C_6-C_{30}$ alkyl$\alpha,\beta$-alkenoate and polytetramethylene glycol, said glycol having been derived conventionally from tetrahydrofuran.

Examples of such specific block alkenoate/cyclic ester copolymers that may be mentioned are the block copolymers of poly (vinyl stearate) and poly (epsilon-caprolactone); of poly (lauryl methacrylate) and poly (epsilon-caprolactone); of poly (stearyl methacrylate) and poly (eta-caprolactone); of poly (isodecyl acrylate) and poly (epsilon-caprolacetone); of poly (myristyl methacrylate) and poly (delta-valerolactone); of poly (stearyl methacrylate) and poly (zeta-entholactone); of poly (steryl 2-hexenoate) and poly (etacaprylolactone); of poly (octyl acrylate) and poly (methyl-delta-valerolacetone); of poly (lauryl methacrylate) and poly (methyl-epsilon-caprolactone); of poly (isodecyl methacrylate) and poly (dimethyl-epsilon-caprolactone); of poly (dodecyl crotonate) and poly (epsilon-caprolactone); of poly (n-hexyl acrylate (77.5%)-isodecyl acrylate (22.5%) copolymer) and poly (epsilon-caprolacetone); of poly (pentacosyl methacrylate) and poly (methyl-detavalerolactone); poly (stearyl methacrylate) and poly (2-keto-1,4 dioxane); and the like. Preferably such copolymers are those of $C_6$–$C_{30}$ alkyl$\alpha,\beta$-alkenoate and caprolacetone, especially epsilon-caprolactone, the most preferred being the copolymer of poly (n-hexyl acrylate (77.5)-isodecyl acrylate (22.5%) copolymer) and the poly (epsilon-caprolactone).

Examples of such specific graft alkenoatevinyl monor/cyclic ester copolymers that may be mentioned are the graft copolymers of poly (vinyl stearate /2-hydroxyethyl methacrylate) and epsilon-caprolactone; of poly (lauryl methacrylate /2-hydroxypropyl methacrylate) and epsilon-caprolactone; of poly (stearyl methacrylate/2-hydroxyethyl acrylate) and eta-caprolactone; of poly (isodecyl acrylate/2-hydroxyethyl methacrylate) and epsilon-caprolactone; of poly (isodecyl acrylate/2-hydroxyethyl acrylate) and epsilon-caprolactone; of poly (isodecyl methacrylate/2-hydroxyethyl acrylate) and epsilon-caprolactone; of poly (isodecyl methacrylate/2-hydroxyethyl methacrylate) and epsilon caprolactone; of poly-(myristyl methacrylate/-hydroxymethyl acrylate) and deta-valerolactone; of poly (stearyl 2-hexenoate/2-hydroxyethyl acrylate) and zeta-etholactone); of poly (octyl acrylolate/2-aminoethyl acrylate) and eta-caprylolactone); of poly (lauryl methacrylate/2-(N-methylamino) ethyl acrylate) and methyl-epsilon-caprolactone; of poly (dodecyl crotonate/2-hydroxypropyl acrylate) and dimethyl-epsilon-caprolactone; of poly (pentacosyl methacrylate/2-aminopropyl acrylate) and methyldeltavalerolactone; of poly (stearyl methacrylate/5-hydroxypentyl methacrylate) and epsilon-caprolactone; of poly (isodecyl acrylate/2-hydroxyethyl methacrylate) and 2-keto-1,4-dioxane; and the like. Preferably such copolymers are those of $C_6$–$C_{30}$ alkyl $\alpha,\beta$-alkenoate-hydroxyalkyl acrylate or hydroxyalkyl methacrylate and caprolactone, especially the copolymers of poly (isodecyl acrylate or methacrylate /2-hydroxyethyl acrylate or methacrylate) and epsilon-caprolactone.

Examples of such specific graft alkenoate and vinyl monomer terminated poly-cyclic ester copolymers that may be mentioned are the graft copolymers of vinyl stearate and 2-hydroxyethyl methacrylate terminated poly-epsilon-caprolactone; of lauryl methacrylate and 2-hydroxypropyl methacrylate terminated poly-epsilon-caprolactone; of stearyl methacrylate and 2-hydroxyethyl acrylate terminated poly-eta-caprolactone; of isodecyl acrylate and 2-hydroxyethyl methacrylate terminated poly-epsilon-caprolactone; of isodecyl acrylate and 2-hydroxyethyl acrylate terminated poly-epsilon-caprolactone; of isodecyl methacrylate and 2-hydroxyethyl methacrylate terminated poly-epsilon-caprolactone; of isodecyl methacrylate and 2-hydroxyethyl acrylate terminated poly-epsilon-caprolactone; of myristyl methacrylate and hydroxymethyl acrylate terminated poly-delta-valerolactone; of stearyl 2-hexenoate and 2-hydroxyethyl acrylate terminated poly zeta-entholactone; of octyl acrylate and 2-aminoethyl acrylate terminated poly-eta-caprolactone; of lauryl methacrylate and 2-(N-methylamine) ethyl acrylate terminated poly-(methyl-epsilon-caprolactone); of dodecyl crotonate and 2-hydroxypropyl acrylate terminated poly (dimethyl-epsilon-caprolactone); of pentacosyl methacrylate and 2-aminopropyl acrylate terminated poly (methyl-deta-valerolacetone); of stearyl methacrylate and 5-hydroxypentyl methacrylate terminated poly-epsilon-caprolactone; of isodecyl acrylate and 2-hydroxyethyl methacrylate terminated poly(2-keto-1,4-dioxane); and the like. Preferably such copolymers are those of $C_6$–$C_{30}$ alkyl $\alpha,\beta$-alkenoate and hydroxyethyl acrylate or hydroxyethyl methacrylate terminated polycaprolactone. especially the graft copolymers of isodecyl acrylate or methacrylate and 2-hydroxyethyl acrylate or methacrylate terminated poly-epsilon-caprolactone.

Of course it is to be understood that the interfacial agents may be used in dry powder form or in solution form and that any suitable inert organic solvent may be employed as a carrier for the interfacial agent to facilitate handling if desired. For example, since interfacial agents containing cyclic esters as the non-solvatable constituent are normally prepared in solution form using an aromatic hydrocarbon solvent e.g. benzene, toluene and the like, it is generally preferred to employ such interfacial agents in the solution form in which they are made. The amount of solvent employed is not narrowly critical although it is obvious that it should not be employed in such a quantity as to be detrimental to the production of the desired particulate thermoplastic polyurethane product. Thus, it is preferred that the solvent not be present in an amount greater than 50 percent by weight of the total dispersion media. It is normally preferred to employ graft copolymers of alkenoate, vinyl monomer and cyclic ester in a solvent solution form containing about 50 percent by weight of the graft copolymer.

It is of course obvious that to increase the rate of reaction of the novel process of this invention any catalyst or mixtures thereof suitable for the production of thermoplastic polyurethane polymers can be employed. Such catalysts are well known in the art, such as tertiary amines and metal containing catalysts.

Illustrative examples of teritary amine catalysts include N,N-dimethylethanolamine, triethanolamine, triisopropanolamine, N-methyldiethanolamine, N-ethyldiethanolamine, triethylamine, tributylamine, trioctylamine, N,N,N',N'-tetramethylenediamine, N,N,N',N'-tetramethyl-1,3butane diamine, bis(2-dimethylaminoethyl)ether, hexadecyldimethylamine, N,N-dimethylbenzylamine, trimethylamine, N,N-dimethyl-2-(2-dimethylaminoethoxy) ethylamine, triethylenediamine (i.e., 1,4-diazabicyclo[2.2.2] octane), N-methylmorpholine, oxyalkylene adducts of the amino groups of primary and secondary amines, and other such amine catalysts which are well known in the art.

Such conventional metal catalysts include both inorganic metal compounds and metal compounds which contain organic groups. Particularly useful catalysts are the organo-tin compounds, such as stannous acylates and the dialkyl tin salts of carboxylic acids. Illustrative examples as such catalysts include stannous acetate, stannous octoate, stannous oleate, dibutyltin diacetate, dibutyltin dilaurate, dibutyltin maleate, dilauryltin diacetate, dioctyltin diacetate, and the like. Especially preferred catalysts are stannous octoate and dibutylin dilaurate.

Of course it is understood that when employed the amount of catalyst need only be a catalytic amount and in general, the particular catalyst employed, the nature of the starting materials, and the like, will largely determine the optimum catalyst concentration. Normally catalyst concentrations of from about 0.001 weight percent to about 0.5 weight percent based on the starting materials present in the reaction medium will be sufficient for most purposes although higher or lower amounts may be employed if desired. Generally a catalyst concentration of from about 0.02 to about 0.1 weight percent is preferred.

The concentration of the interfacial agent can vary from about 0.1 weight percent, to about 10 weight percent, and higher, based on the total weight of the starting materials. A practical concentration is from about 1.5 to about 5.0 weight percent of interfacial agent with about 3 weight percent being preferred.

The novel polymerization reaction of this invention can be conducted over a wide temperature range such as from about 60° C to about 180° C with about 140° C being the most preferred temperature. The optimum temperature to employ may, of course, be significantly influenced by the stability of the resulting polymeric product and the boiling point of the inert organic vehicle.

The novel process of this invention is conducted for a period of time sufficient to produce the particulate polymeric product. Of course, the reaction time will vary depending upon the operative temperature, the nature of the starting materials, interfacial agent, and catalyst if employed, the choice of the inert organic vehicle, and other obvious factors. The reaction time can vary from several minutes to several hours, e.g., up to 24 hours, and more, depending on the variables illustrated above. The most desirable operative conditions can easily be arrived at by routine experiments to achieve a practical and commercially acceptable reaction rate. Preferably the polymerization reaction is effected in the liquid phase in an essentially non-aqueous reaction medium. It is desirable also to effect the polymerization reaction under an inert atmosphere, e.g., nitrogen and pressure does not appear to be a critical factor.

Any suitable technique can be employed in the production of the thermoplastic polyurethane polymers of the instant invention, such as variations in process conditions and manipulative steps known in the art. Conventional equipment and material generally used in the art can also be employed. The order of addition of the dihydroxy containing compound, diisocyanate, chain extending agent, interfacial agent, inorganic vehicle and catalyst to the reaction zone does not appear to be critical however it is obviously generally preferred to avoid premature reaction between the diisocyanate and the other ingredients. A convenient method generally employed is to add the dihydroxy containing compound and the chain extending agent to the inert organic (medium) and disperse them therein at an appropriate elevated temperature, e.g. 60° C to 140° C, using the interfacial agent. The catalyst and diisocyanate are then added to the dispersed mixture and the polymerization allowed to proceed with stirring for a given period of time at the prescribed reaction temperature. A suspension of particulate thermoplastic polyurethane polymer is obtained which is allowed to cool to ambient temperature. The solid polyurethane particles obtained settle rapidly but are readily redispersible in the inert reaction medium. Said particles are easily isolated by any obvious simple procedure, e.g. filtration. Residual hydrocarbon and unreacted materials can be removed if desired by any conventional technique such as washing, air drying and heating under reduced pressure.

The relative amounts of the dihydroxy containing compound, the chain extending agent and the organic diisocyanate employed in accordance with the above described process for producing particulate thermoplastic polyurethane polymers in accordance with this invention are not narrowly critical. The relative amounts of these three components can be the same amounts required to produce conventional thermoplastic polyurethane polymers and such relative amounts are well known in the art. For example in theory one NCO group is equivalent to one of the functional groups, e.g. OH, of the dihydroxy containing compound or the chain extending agents. Thus the amount of diisocyanate employed is dependent upon the amount of the dihydroxy containing compound and the chain extending agent and in order to obtain a maximum degree of polymerization and efficiency it is preferred that the amount of diisocyanate be equivalent or as near to equivalent as possible to the dihydroxy containing compound and the chain extending agent so that there are essentially no free isocyanate and functional groups, e.g. OH, remaining in the reaction product. Of course lower or higher amounts of diisocyanate may be employed, but such is not generally preferred. Illustrative examples of the more preferred molar ratios of dihydroxy containing compound, diisocyanate and chain extending agent are 1:2:1, 1:3:2 and 1:4:3.

The amount of inert organic vehicle employed in the novel process can vary over a wide range. Practical and economic consideration, however, will dictate the quantity of vehicle that is utilized. Preferably the amount of inert organic vehicle employed will be such that the particulate thermoplastic polyurethane polymeric product will comprise from about five weight percent solids to about 80 weight percent in the reaction product mixture. While lower or higher amounts of solids can be present, at the lower end of the above range one has a very fluid mixture whereas at the higher end of said range the mixture becomes difficult to stir. Most preferred is a reaction mixture containing about 50 weight percent solids of the particulate thermoplastic polymeric product.

Unlike prior art processes in which the resulting thermoplastic polyurethane polymers often times end up as a monolithic mass, the practice of the present process results in the production of novel thermoplastic polyurethane polymers which are obtained as a dispersion of discrete particles of relatively uniform size in the polymerization reaction medium. The process economies of obtaining polymer in discrete particle form in an inert organic vehicle in contrast to a monolithic mass are obvious both with respect to the novel polymerization process as well as in the handling and utilization of the novel polymer product obtained therefrom. For example, the practice of the instant process results in excellent process control of the polymerization reaction and the product desired. In terms of powder coatings the instant process of this invention also avoids pollution and toxicity problems that may be present with various different types of solvent based systems. The percent conversion to the particulate polymer is high and recovery from the reaction product mixture is relatively simple.

The novel thermoplastic polyurethane polymer is obtained in discrete, free-flowing, non-agglomerative particle form in the inert organic vehicle and in high purity. As intimated previously it is believed that the interfacial agent is associated integrally with the particulate polymer product primarily through the non-solvatable or anchoring constituent of said agent. Thus the powdered particulate thermoplastic polymer product consisting essentially of spherical particles generally on the order of about 10 to about 300 microns in diameter, but which may be smaller or larger, can easily be recovered from the reaction mixture by simple filtration or decantation, followed by drying under reduced pressure and mild temperatures, e.g. about 50° C. The particulate polymer is also readily dispersible in inert normally liquid saturated hydrocarbons. Said thermoplastic polyurethane polymers have a wide range of utility already well known in the polyurethane elastomer art as witnessed by the above cited prior art. For example, the products prepared in accordance with this invention are suitable in all types of applications where an elastomeric product is desired such as in the production of rubber shock mounts, gaskets, elastomeric filaments for garments, liners for upholstery, sporting goods, e.g. basketballs, footballs, etc., and the like. One of the obvious advantages of the instant invention is that the particulate polymer product of the present invention does not have to undergo further treatment before it can be utilized in application techniques heretofore employed with other powdered polymers such as, flame coating, heat substrate coatings, rotational and injection molding, calendering, powder blending with other polymers, sintered shaped articles and coatings, and the like. The particulate thermoplastic polyurethane polymers also lend themselves to use as filters and to fluidized bed coatings and claddings, as well as to electrostatic coating techniques and the like.

The following examples are illustrative of the present invention and are not to be regarded as limitative. It is to be understood that all parts, percentages and proporations referred to herein and in the appended claims are by weight unless otherwise indicated.

EXAMPLE 1

396.0 grams of epsilon-caprolactone were charged to a 2 liter stirred flask and heated to 150° C. Then 4.0 grams of 2-hydroxyethyl acrylate were added and the polymerization allowed to proceed for 3 hours at 150° C. The hydroxyethyl acrylate terminated poly-epsilon-caprolactone copolymer obtained had a reduced viscosity of 0.25 dl/g. measured as a solution of 0.2 grams in 100 ml. of benzene at 30° C. Said copolymer was cooled to about 110° C. and diluted with 800 grams of toluene. The temperature was maintained at 100° C. and a solution of 0.0396 grams of dibenzoyl peroxide in 396.0 grams of isodecyl acrylate was added dropwise over a period of 1 hour. After stirring for an additional 2 hours a toluene solvent solution containing about 50 percent by weight of the graft isodecyl acrylate/hydroxyethyl acrylate terminated poly-epsilon-caprolactone copolymer interfacial agent was obtained which was cooled and bottled.

EXAMPLE 2

A resin kettle was equipped with a stirrer, thermometer and reflux condenser. 126.2 grams of decane as the inert organic vehicle, 96.72 grams (0.05 mole) of a diethylene glycol initiated poly-epsilon-caprolactone polyol having an average molecular weight of about 2,000 and a hydroxyl number of about 56.1, 4.5 grams (0.05 mole) of 1,4-butanediol as a chain extender, and 7.56 grams of the graft isodecyl acrylate/hydroxyethyl acrylate terminated poly-epsilon-caprolactone copolymer interfacial agent solution of Example 1 were added with stirring and heated to about 140° C. Then 0.025 grams of stannous octoate were added to the dispersed mixture followed immediately by 25.02 grams (0.1 mole) of MDI, a 4,4'-diphenylmethane diisocyanate product of Mobay Chemical Company. Solid particulate termoplastic polyurethane polymer started to form almost immediately and the reaction was allowed to proceed for one hour at about 140° C. The reaction product mixture (about 50% total solids) having the suspended particulate polymer particles was allowed to cool to room temperature while stirring and the solid product particles allowed to settle. The decane was decanted, the product washed with hexane, filtered and vacuum dried. There was obtained a fine, uniform particulate polymer of thermoplastic polyurethane which was free-flowing, non-agglomerative and readily redispersible in the decane. The yield was essentially 100 percent and the powdered, particulate polymer product had a reduced viscosity of 0.97 dl./g. as measured on a solution of 0.2 grams in 100 ml. of dimethylformamide at 30° C. A plaque was molded from the essentially non-crosslinked particulate thermoplastic polyurethane polymer at 180° C. and a pressure of 4000 psi. and the molded product was found to have a tensile strength of 5600 psi. and an elongation value of 725 percent.

By way of comparison a thermoplastic polyurethane polymer was prepared in the same manner, using the same ingredients, amounts and conditions, except that the decane and interfacial agent were omitted. A plaque molded from this conventionally produced thermoplastic polyurethane polymer at 180° C. and a pressure of 4000 psi. exhibited a tensile strength of 5041 psi. and an elongation value of 600 percent.

EXAMPLE 3

The procedure of Example 2 was repeated using 143 grams of decane, 96.72 grams (0.05 mole) of a diethylene glycol initiated poly-epsilon-caprolactone polyol having an average molecular weight of about 2000 and a hydroxyl number of about 56.1, 9.01 grams (0.1 mole) of 1,4-butanediol, 8.59 grams of the graft isodecyl acrylate/hydroxyethyl acrylate terminated poly-epsilon-caprolactone copolymer interfacial agent solution of Example 1, 0.03 grams of stannous octoate and 37.54 grams (0.15 mole) of MDI. A fine, uniform particulate polymer of thermoplastic polyurethane in a yield of about 100 percent was obtained from the reaction product mixture (about 50 percent total solids). The powdered particulate polymer product obtained was free-flowing, non-agglomerative and readily redispersible in the decane and had a reduced viscosity of 1.07 dl./g. as measured on a solution of 0.2 grams in 100 ml. of diemthylformamide at 30° C. A plaque molded from the essentially non-crosslinked particulate thermoplastic polyurethane polymer product in the same manner as Example 2 exhibited tensile strength of 6812 psi. and an elongation value of 536 percent.

By way of comparison a thermoplastic polyurethane polymer was prepared in the same manner using the same ingredients, amounts and conditions, except that the decane and interfacial agent were omitted. A plaque molded from this conventionally produced thermoplastic polyurethane polymer at the same temperature and pressure as that for the above particulate product exhibited a tensile strength of 6600 psi. and an elongation value of 587 percent.

EXAMPLE 4

The procedure of Example 2 was repeated using 160.3 grams of decane, 96.72 grams (0.05 mole) of a diethylene glycol initiated poly-epsilon-caprolactone polyol having an average molecular weight of about 2000 and a hydroxyl number of about 56.1, 13.52 grams (0.15 mole) of 1,4-butanediol, 9.6 grams of the graft isodecyl acrylate/hydroxyethyl acrylate terminated poly-epsilon-caprolactone copolymer interfacial agent solution of Example 1, 0.032 grams of stannous octoate and 50.05 grams (0.2 mole) of MDI. A fine, uniform particulate polymer of thermoplastic polyurethane in a yield of about 100 percent was obtained from the reaction product mixture (about 50% total solids). The powdered, particulate polymer product obtained was free-flowing, non-agglomerative and readily redispersible in the decane and had a reduced viscosity of 1.04 dl./g. as measured on a solution of 0.2 grams in 100 ml. of dimethylformamide at 30° C. A plaque molded from the essentially non-crosslinked particulate thermoplastic polymer product in the same manner as Example 2 exhibited a tensile strength of 7566 psi. and an elongation value of 463 percent.

By way of comparison a thermoplastic polyurethane polymer was prepared in the same manner using the same ingredients, amounts and conditions, except that the decane and interfacial agent were omitted. A plaque molded from this conventionally produced thermoplastic polyurethane polymer at the same temperature and pressure as that for the above particulate product exhibited a tensile strength of 7409 psi. and an elongation value of 510 percent.

EXAMPLE 5

A resin kettle was equipped with a stirrer, thermometer, and reflux condensor. 170 grams of decane, 105.33 grams (0.05 mole) of a polyethyleneglycol/adipate copolymer having an average molecular weight of about 2100 and a hydroxyl number of about 56, 13.52 grams (0.15 mole) of 1,4-butanediol, and 10.2 grams of the graft isodecyl acrylate/hydroxyethyl acrylate terminated poly-epsilon-caprolactone copolymer interfacial agent solution of Example 1, were added with stirring and heated to about 140° C. Then 0.034 grams of stannous octoate were added to the dispersed mixture followed immediately by 50.05 grams (0.2 mole) of MDI. Solid particulate thermoplastic polyurethane polymer started to form almost immediately and the reaction was allowed to proceed to completion at about 140° C. The reaction product mixture (about 50% total solids) having the suspended particulate polymer particles was allowed to cool to room temperature while stirring and the solid product particles allowed to settle. The decane was decanted, the product washed with hexane, filtered and vacuum dried. There was obtained a fine, uniform particulate polymer of thermoplastic polyurethane which was free-flowing, non-agglomerative and readily redispersible in the decane.

EXAMPLE 6

The procedure of Example 2 was repeated using 163.7 grams of decane, 100.15 grams (0.05 mole) of a polyoxypropylene glycol polymer having an average molecular weight of about 2000 and a hydroxyl number of 54.7-57.5, 13.52 grams of (0.15 mole) of 1,4-butanediol, 9.8 grams of the graft isodecyl acrylate/hydroxyethyl acrylate terminated poly-epsilon-caprolactone copolymer interfacial agent solution of Example 1, 0.03 grams of stannous octoate and 50.05 grams (0.2 mole) of MDI. A fine, uniform particulate polymer of thermoplastic polyurethane in a yield of about 100 percent was obtained which could easily be isolated from the reaction product mixture (about 50% solids) by filtration. The isolated powdered, particulate polymer product obtained had a reduced viscosity of 0.452 dl./g. as measured on a solution of 0.2 grams in 100 ml. of dimethyl formamide at 30° C.

EXAMPLE 7

The procedure of Example 2 was repeated using 127.0 grams of decane, 88.9 grams (0.03 mole) of a polyoxypropylene glycol polymer having an average molecular weight of about 2000 and a hydroxyl number of 54.7 – 57.5 and containing 20 weight percent of finely divided polyacrylonitrile, 8.11 grams (0.09 mole) of 1,4-butanediol, 5.76 grams of the graft isodecylacrylate/hydroxyethylacrylate terminated poly-epsilon-caprolactone copolymer interfacial agent solution of Example 1, 0.019 grams of stannous octoate and 30.03 grams (0.12 mole) of MDI. An orange powdered, particulate polymer of thermoplastic polyurethane was readily isolated and obtained. A molded plaque produced from the essentially non-crosslinked particulate thermoplastic polyurethane polymer product exhibited a tensile strength of 786 psi. and an elongation value of 199 percent.

EXAMPLE 8

150 parts of acetone, 71.1 parts of vinyl chloride, 28.9 parts of lauryl methacrylate and 1.5 parts of benzoyl peroxide were charged to an autoclave and heated to 51° C. for 154 hours. The resulting slurry was washed thoroughly with isopropanol, centrifuged and dried for 64 hours at 30° C. and 2.0 mm. Hg. There was obtained a lauryl methacrylate/vinyl chloride copolymer interfacial agent (about 90% conversion) product. Said interfacial agent was a dry white powder and had a reduced viscosity of 0.29 dl./g. as measured on a solution of 0.2 grams in 100 ml. of benzene at 30° C.

EXAMPLE 9

A resin kettle equipped with a stirrer, thermometer and reflux condensor was charged with 200 grams (0.1 mole) of a diethylene glycol initiated polyepsiloncaprolactone polyol having an average molecular weight of about 2000 and a hydroxyl number of about 56.1, 17.4 grams (0.1 mole) of 1,10-dihydroxy n-decane as a chain extender, 401.1 grams of an inert organic vehicle mixture consisting of about 70–75% saturated $C_6$–$C_{10}$ aliphatic hydrocarbons and 25–30% $C_6$–$C_{10}$ cycloaliphatic hydrocarbons said mixture having a boiling point of 153°–180° C., 8.02 grams of the lauryl methacrylate/vinyl chloride copolymer interfacial agent of Example 8 and 0.54 grams of stannous octoate. The mixture was heated to 90° C. and 50.0 grams (0.2 mole) of MDI were added. After continuing the reaction with stirring for 3 hours at 120° C., the particulate powdered thermoplastic polyurethane product was filtered from the resultant reaction mixture (about 60% total solids), washed with hexane and dried at room temperature. The resultant free-flowing, non-agglomerative particulate thermoplastic polymer product obtained had a reduced viscosity of 0.62 dl./g. as measured on a solution of 0.2 grams in 100 ml. of dimethyl formamide at 30° C. A photomicrograph of the particles revealed them to be spheres with a range of 10 to 200 microns. A molded plaque prepared from the particulate thermoplastic polyurethane polymer product exhibited a tensile strength of 1185 psi. and an elongation value of 550 percent.

EXAMPLE 10

A particulate thermoplastic polyurethane polymer was obtained as a 45 percent total solids dispersion in heptane using the lauryl methacrylate/vinyl chloride copolymer interfacial agent of Example 8, heptane as the inert organic vehicle, stannous octoate, and as the ureathane forming reactants a diethylene glycol initiated poly-epsilon-caprolactone polyol having an average molecular weight of about 2000 and a hydroxyl number of about 56.1, MDI and 1,4-butanediol in a 1/4/3 mole ratio, the polymerization reaction being conducted at 90° C. The powdered particulate thermoplastic polyurethane polymer product evidenced no conglomeration of particles and although the particles settled out rapidly when stirring was stopped, they could be readily redispersed in the heptane.

EXAMPLE 11

An interfacial agent block copolymer of poly(n-hexyl acrylate-isodecyl acrylate copolymer) and poly-epsilon-caprolactone having an average molecular weight of about 15,000 and a reduced viscosity of 0.3 dl./g. as measured on a solution of 0.2 grams in 100 ml. of benzene at 30° C. was prepared by transesterifying at 140°–150° C. for 20 hours with stirring 33.5 grams of a copolymer of n-hexyl acrylate (77.5%) and isodecyl acrylate (22.5%) with 22.3 grams of poly-epsilon-caprolactone in the presence of 0.04 grams of p-toluene sulfonic acid.

EXAMPLE 12

In a manner similar to the procedure of Example 2, a particulate thermoplastic polyurethane polymer was prepared using 126.2 grams of decane, 96.72 grams (0.05 mole) of a diethylene glycol initiated polyepsilon-caprolactone polyol having an average molecular weight of about 2000 and a hydroxyl number of about 56.1, 4.5 grams (0.05 mole) of 1,4-butanediol, 25.02 grams (0.1 mole) of MDI, 3.78 grams of the block copolymer of poly(n-hexyl acrylate-isodecyl acrylate copolymer) and poly-epsilon-caprolactone interfacial agent of Example 11 and 0.025 grams of stannous octoate. The reaction was carried out at 130° C. for 3 hours with moderate stirring. The resultant particulate thermoplastic polyurethane polymer product settled rapidly from the reaction product mixture (about 50% total solids), but could be readily redispersed in the decane. The supernatant decane liquid was decanted and the solid particles washed with hexane and dried at room temperature. The resultant particulate thermoplastic polyurethane polymer obtained was a free-flowing powder of spherical shape and had a particle size of 20 to 200 microns. The reduced viscosity of the particulate polymer product was 1.17 dl./g. as measured on a solution of 0.2 grams in 100 ml. of dimethyl formamide at 30° C. A molded plaque produced from the particulate thermoplastic polyurethane polymer product was clear and uncolored.

EXAMPLE 13

The procedure of Example 12 was repeated using mineral oil as the inert organic vehicle. There was obtained particulate thermoplastic polyurethane polymer as a fine free-flowing powder having a reduced viscosity of 1.05 dl./g. as measured on a solution of 0.2 grams in 100 ml. of dimethyl formamide at 30° C.

Various modifications and variations of this invention will be obvious to a worker skilled in the art and it is to be understood that such modifications and variations are to be included within the purview of this application and the spirit and scope of the appended claims.

What is claimed is:

1. A process for producing a particulate thermoplastic polyurethane polymer which comprises contacting and reacting
   a. an organic dihydroxy containing polymer selected from the group consisting of polyether diols, polyester diols and polymer/diols;
   b. an organic difunctional chain extending agent having two active hydrogen atoms reactive with the isocyanate groups of the diisocyanate compound;
   c. an organic diisocyanate compound;
   the polyurethane forming ingredients of (a), (b) and (c) being present in such an amount that the molar amount of (c) is essentially equivalent to the molar amount of (a)+(b) so that the polyurethane contains essentially no unreacted hydroxyl groups and isocyanate groups; and
   d. from about 0.1 to about 10 weight percent, based on the weight of the particulate polymer product, of an organic polymeric interfacial agent, which has a reduced viscosity value of from about 0.01 to about 5; said interfacial agent being characterized (1) by a solvatable constituent (i) which is solvatable in inert normally liquid saturated hydrocarbons; (ii) which is essentially incompatible with the soft segment of the particulate thermoplastic polyurethane polymer product, and (iii) which has an average molecular weight of up to about 500,000 and (2) by a non-solvatable constituent (i) which is non-solvatable with such inert normally liquid, saturated, hydrocarbons, (ii) which is compatible with the soft segment of the particulate thermoplastic polyurethane polymer product, and (iii) which has an average molecular weight of at least about 1000 and is at least about 0.05 to about 10 times the average molecular weight of the solvatable constituent; and wherein the interfacial agent is selected from the group consisting of block copolymers of $C_6$–$C_{30}$ alkyl $\alpha$, $\beta$-alkenoate and a cyclic ester, and the graft copolymers of $C_6$–$C_{30}$ alkyl $\alpha$, $\beta$-alkenoate, a vinyl monomer of the formula

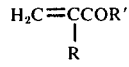

wherein $R$ is hydrogen or an alkyl radical having from 1 to 3 carbon atoms, $R'$ is a radical selected from the class consisting of $-OC_nH_{2n}OH-$, $-OC_nH_{2n}NH_2$, —NHC$_n$H$_{2n}$OH, —NHC$_n$H$_{2n}$NH$_2$, —OC$_n$H$_{2n}$NHR'' and —NHC$_n$H$_{2n}$NHR'' where $n$ has a value of 1 to 5 and R'' is an alkyl radical of 1 to 10 carbon atoms, and a cyclic ester;

e. in the presence of an inert organic vehicle in which the ingredients of (a), (b) and (d) are dispersible and in which the particulate thermoplastic polyurethane polymer product is insoluble, the amount of said vehicle being such that the particulate thermoplastic polyurethane polymer product will comprise from about 5 weight per cent solids to about 80 weight percent solids in the reaction product mixture;

said reaction being conducted under essentially anhydrous conditions and for a period of time sufficient to produce the particulate thermoplastic polyurethane polymer.

2. A process as defined in claim 1, wherein a catalytic amount of a catalyst for the production of the polyurethane product is also present.

3. A process as defined in claim 2, wherein the dihydroxy containing polymer is a polyoxyalkylene glycol, wherein the diisocyanate compound is an aromatic diisocyanate and wherein the chain extending agent is a straight chain saturated aliphatic glycol containing from 2 to 10 carbon atoms.

4. A process as defined in claim 2, wherein the dihydroxy containing polymer is a polymer/polyol diol, wherein the diisocyanate compound is an aromatic diisocyanate, and wherein the chain extending agent is a straight chain saturated, aliphatic glycol containing from 2 to 10 carbon atoms.

5. A process as defined in claim 2, wherein the dihydroxy containing polymer is a hydroxy terminated polyester, wherein the diisocyanate compound is an aromatic diisocyanate and wherein the chain extending agent is a straight chain saturated aliphatic glycol containing from 2 to 10 carbon atoms.

6. A process as defined in claim 5, wherein the hydroxy terminated polyester is a polylactone diol.

7. A process as defined in claim 6, wherein the polylactone diol is a polycaprolactone diol.

8. A process as defined in claim 7, wherein the interfacial agent is selected from the class consisting of a graft copolymer of C$_6$–C$_{30}$ alkyl $\alpha$, $\beta$-alkenoate, hydroxyethyl acrylate and polycaprolactone and a graft copolymer of C$_6$–C$_{30}$ alkyl $\alpha$, $\beta$-alkenoate, hydroxyethyl methacrylate and polycaprolactone.

9. A process as defined in claim 8, wherein the inert organic vehicle is a saturated aliphatic hydrocarbon.

10. A process as defined in claim 9, wherein the dihydroxy containing polymer is a polyepsilon-caprolactone diol, wherein the chain extender is 1,4-butanediol, wherein the diisocyanate compound is 4,4' diphenylmethane diisocyanate and wherein the inert organic vehicle is decane.

11. A process as defined in claim 10, wherein the interfacial agent is selected from the group consisting of a graft copolymer of isodecyl acrylate, hydroxyethyl acrylate and polyepsilon-caprolactone, a graft copolymer of isodecyl acrylate, hydroxyethyl methacrylate and polyepsilon-caprolactone, a graft copolymer of isodecyl methacrylate, hyroxyethyl methacrylate and polyepsilon-caprolactone, and a graft copolymer of isodecyl methacrylate, hydroxyethyl acrylate and polyepsilon-caprolactone.

12. A process as defined in claim 11, wherein the interfacial agent is selected from the group consisting of a graft copolymer of isodecyl acrylate, hydroxyethyl acrylate and polyepsilon-caprolactone, and a graft copolymer of isodecyl acrylate, hydroxyethyl methacrylate and polyepsilon-caprolactone, wherein the catalyst is stannous octoate and wherein the amount of decane is such that the particulate thermoplastic polyurethane polymer comprises about 50 percent solids in the reaction product mixture.

13. A process as defined in claim 12, wherein the interfacial agent is employed in the form of a solvent solution containing about 50 percent by weight of the interfacial agent.

14. A process as defined in claim 1, wherein the particulate thermoplastic polyurethane polymer is separated from the reaction product mixture and recovered as a dry, free-flowing, non-agglomerative powder.

15. A particulate thermoplastic polyurethane polymer produced according to the process of claim 1.

16. A particulate thermoplastic polyurethane polymer produced according to the process of claim 6.

17. A particulate thermoplastic polyurethane polymer produced according to the process of claim 9.

18. A particulate thermoplastic polyurethane polymer produced according to the process of claim 12.

* * * * *